United States Patent
Kubota et al.

(10) Patent No.: US 7,453,519 B2
(45) Date of Patent: Nov. 18, 2008

(54) METHOD AND APPARATUS FOR CONVERTING IMAGES AT A GIVEN FRAME OR FIELD RATE TO SECOND AND THIRD FRAME OR FIELD RATES WHILE MAINTAINING SYSTEM SYNCHRONISM

(75) Inventors: Akihiro Kubota, Tokyo (JP); Shinzo Matsui, Kitatsuru-gun (JP)

(73) Assignee: Olympus Corporation, Tokyo (JP)

( * ) Notice: Subject to any disclaimer, the term of this patent is extended or adjusted under 35 U.S.C. 154(b) by 452 days.

(21) Appl. No.: 11/089,775

(22) Filed: Mar. 25, 2005

(65) Prior Publication Data
US 2005/0219378 A1 Oct. 6, 2005

(30) Foreign Application Priority Data
Mar. 30, 2004 (JP) ............................. 2004-097486

(51) Int. Cl.
H04N 7/01 (2006.01)
H04N 1/393 (2006.01)
(52) U.S. Cl. .................. 348/459; 348/443; 348/441; 348/445; 348/222.1
(58) Field of Classification Search ................. 348/441, 348/443, 456, 459, 911, 97, 451, 452, 910, 348/445, 704, 222.1; 382/299, 298
See application file for complete search history.

(56) References Cited
U.S. PATENT DOCUMENTS 5,754,248 A * 5/1998 Faroudja .................... 348/474
5,841,480 A * 11/1998 Rhodes ....................... 348/459
5,999,220 A * 12/1999 Washino ..................... 348/441
6,069,664 A * 5/2000 Zhu et al. .................... 348/448
6,222,589 B1 * 4/2001 Faroudja et al. ............. 348/448
6,370,198 B1 * 4/2002 Washino ................. 375/240.26
6,411,341 B1 * 6/2002 De Haan et al. ............. 348/714
6,462,785 B1 * 10/2002 Carraro et al. .............. 348/578
RE38,079 E * 4/2003 Washino et al. ............. 348/722

(Continued)

OTHER PUBLICATIONS

"Motion Picture World", "Kineco Recording Basis" htt//www.imagica.com/movie/tech/kineco/kine2-01.html with English Translation. Copyright 2002-2004.
Nobutada Yagi et al. "All Cinema Production", First Publication Dec. 30, 1999, with English Translation.

*Primary Examiner*—David L Ometz
*Assistant Examiner*—Jean W. Désir
(74) *Attorney, Agent, or Firm*—Volpe and Koenig, P.C.

(57) ABSTRACT

This imaging device includes an imaging element, a field rate conversion processing section, and a frame rate conversion processing section. The imaging element converts an image of a photoelectric subject photographically, and outputs a picture image signal which consists of frames at a first frame rate. The field rate conversion processing section converts the picture image signal at the first frame rate into a television signal at a second frame rate which is smaller than the first frame rate. The frame rate conversion processing section converts the picture image signal at the first frame rate into a cinema film signal at a third frame rate which is smaller than the first frame rate, and which is different from the second frame rate.

10 Claims, 10 Drawing Sheets

U.S. PATENT DOCUMENTS

| | | | |
|---|---|---|---|
| 6,580,470 B1 * | 6/2003 | Eckersley et al. | 348/771 |
| 6,700,622 B2 * | 3/2004 | Adams et al. | 348/448 |
| 6,724,433 B1 * | 4/2004 | Lippman | 348/558 |
| 6,771,888 B1 * | 8/2004 | Cookson et al. | 386/95 |
| 6,873,368 B1 * | 3/2005 | Yu et al. | 348/441 |
| 7,023,486 B2 * | 4/2006 | Takayama | 348/441 |

* cited by examiner

| INPUT FRAME 120F/s | ADDITIVE COEFFICIENT k | SWITCH 1003 | SWITCH 1006 | SWITCH 1009 |
|---|---|---|---|---|
| ⋮ | ⋮ | ⋮ | ⋮ | ⋮ |
| F01 | 0 | SW102 | SW202 | SW301 |
| F02 | 1/2 | ↑ | ↑ | ↑ |
| F03 | 2/3 | ↑ | ↑ | ↑ |
| F04 | 3/4 | ↑ | ↑ | ↑ |
| F05 | 4/5 | SW101 | SW201 | SW302 |
| F06 | 0 | ↑ | ↑ | ↑ |
| F07 | 1/2 | ↑ | ↑ | ↑ |
| F08 | 2/3 | ↑ | ↑ | ↑ |
| F09 | 3/4 | ↑ | ↑ | ↑ |
| F10 | 4/5 | SW102 | SW202 | SW301 |
| ⋮ | ⋮ | ⋮ | ⋮ | ⋮ |

METHOD AND APPARATUS FOR CONVERTING IMAGES AT A GIVEN FRAME OR FIELD RATE TO SECOND AND THIRD FRAME OR FIELD RATES WHILE MAINTAINING SYSTEM SYNCHRONISM

BACKGROUND OF THE INVENTION

1. Field of the Invention

The present invention relates to an imaging device which generates a picture image signal for a picture image for cinema film and a picture image for television which have different frame rates.

Priority is claimed on Japanese Patent Application No. 2004-097486, filed Mar. 30, 2004, the content of which is incorporated herein by reference.

2. Description of Related Art

Conventionally, a picture image of a cinema film is photographed at 24 frames/second, in order to project such a picture image of a cinema film via television, so called 2-3 pulldown in which two frames of the cinema film are converted into 5 fields is performed. Incidentally, frame rate is the number of pictures which are displayed during one second. In the NTSC (National TV Standards Committee) standard, 525 scan lines are drawn for one frame, this scanning being divided into two interlaced scanning episodes, but a field consists of scanning the even numbered scan lines or the odd numbered scan lines one time. In other words, according to the NTSC standard, a single frame is made up from two fields.

Figure 10:
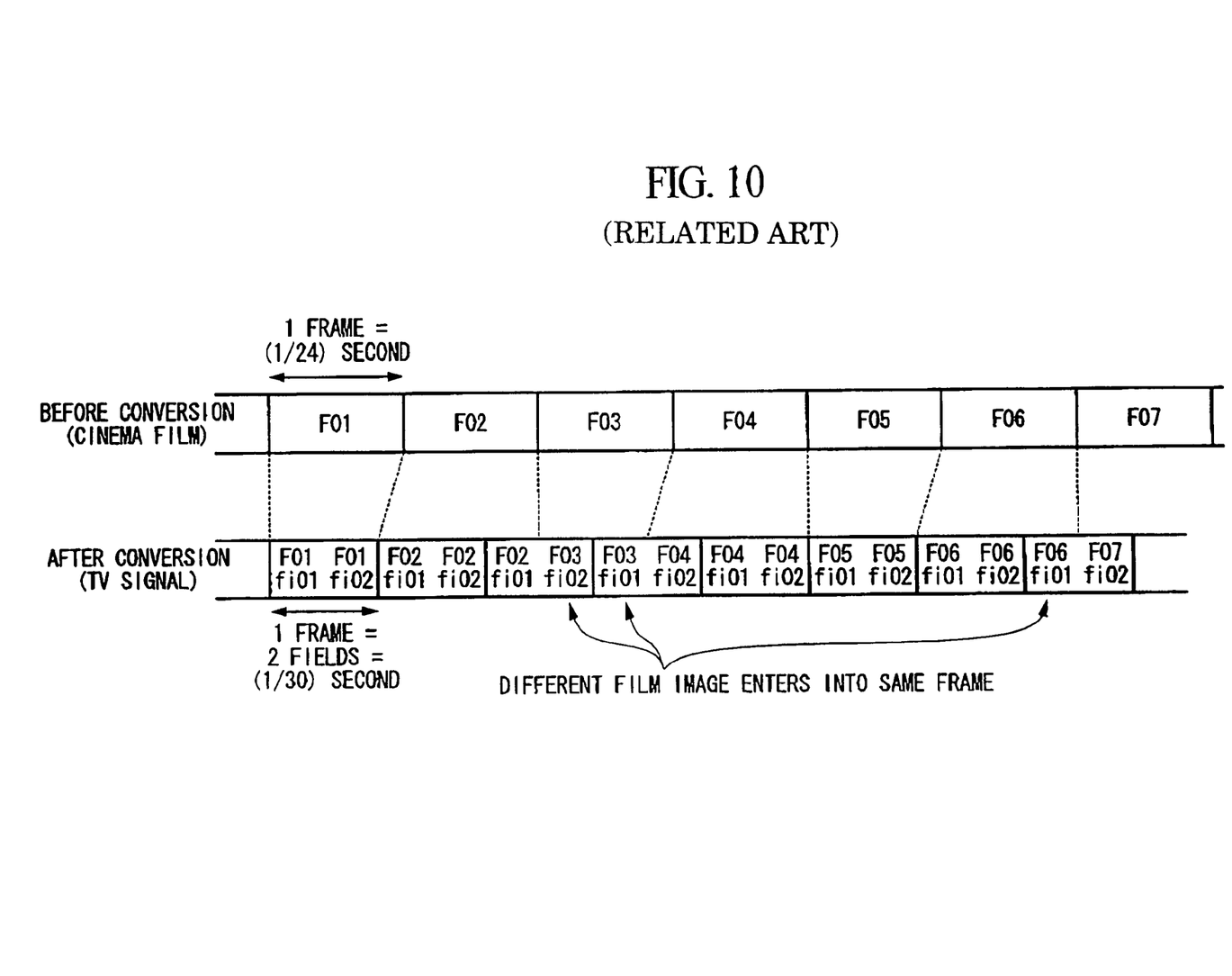
FIG. 10 is a reference figure for explanation of a conventional 2-3 pulldown method.

In the following, the 2-3 pulldown method will be explained with reference to FIG. 10. According to the 2-3 pulldown method, a cinema film which is photographed at 24 frames/second is converted into a television signal at 60 fields/second. In 2-3 pulldown, the first frame of the cinema film is converted into a first frame (two fields) of the television signal. Furthermore, the second frame of the cinema film is converted into a total of the second frame (two fields) of the television signal and one field of its third frame. Subsequently, a single frame of the cinema film is converted, alternatingly, into two fields and three fields of the television signal in the same manner.

Figure 11:
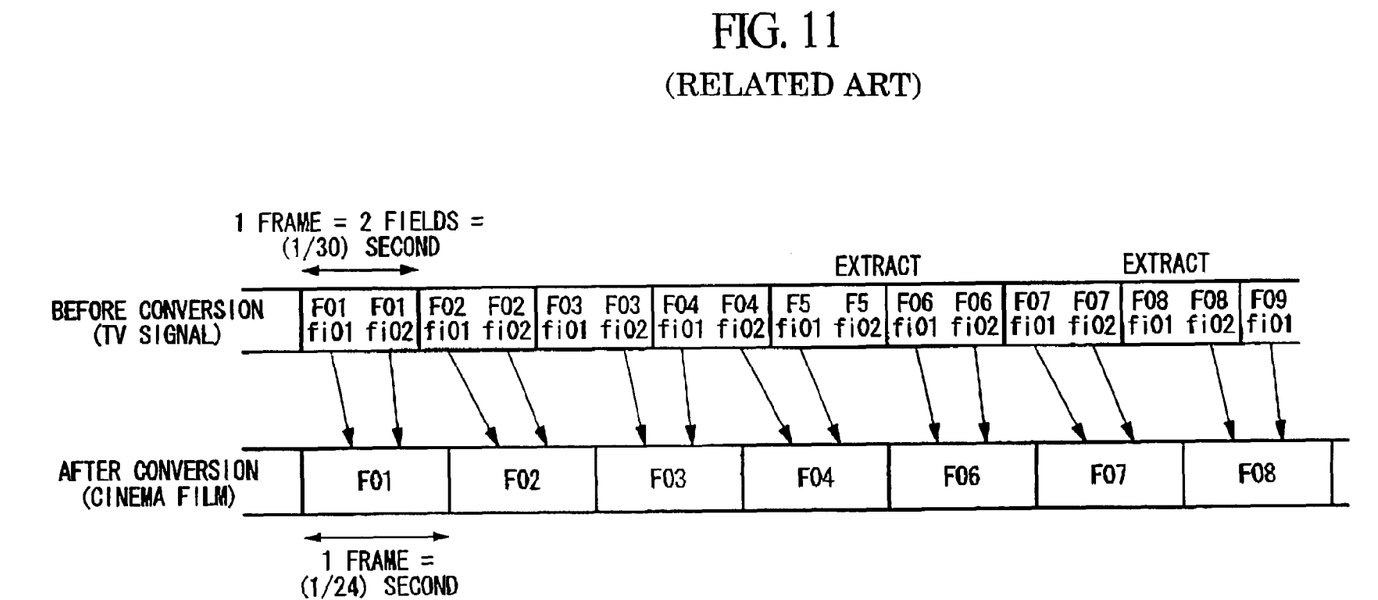
FIG. 11 is a reference figure for explanation of a conventional kinescope method.

On the other hand, in order to convert a picture image for television which is photographed at 60 fields/second (=30 frames/second) for cinema film, a so called kinescope recorder method is employed. With this kinescope method, a single frame is extracted from five frames of the television signal, and remaining four frames are converted into four frames of cinema film. FIG. 11 shows this kinescope method. Five frames of the television picture image which is photographed at 60 fields/second are temporally matched to four frames of the cinema film, so that one frame is cut out for every five frames of television signal, thus converting the television image into a cinema film. The above method is described in "All Cinema Production, Basis and Guide to Cinema Production Technology", (Nobutada Yagi and eight others, Photographic Industry Publishing Corp., 31 Jul. 2000).

Furthermore, although a multi frame rate compliant imaging device which can set any desired value for the frame rate during photography by controlling the drive of an imaging element is considered, since the output is single-standard accordingly the frame rate is fixed to predetermined frame rate during photographic recording.

Therefore, 2-3 pulldown is needed to convert a picture image for a cinema film which is photographed at 24 frames/second during recording into a television signal subsequently, a kinescope is needed to convert the television signal into the picture image of cinema film.

SUMMARY OF THE INVENTION

With the present invention, there is proposed an imaging device which includes:

a photographic section which photoelectrically converts an image of a subject, and which outputs a picture image signal which consists of frames at a first frame rate; a first frame rate conversion section which converts the picture image signal at the first frame rate which is outputted by the photographic section into a picture image signal at a second frame rate which is smaller than the first frame rate; and a second frame rate conversion section which converts the picture image signal at the first frame rate into a picture image signal at a third frame rate which is smaller than the first frame rate, and which is different from the second frame rate.

With the imaging device according to the present invention as described above, it is preferable for the second frame rate to be 1/m of the first frame rate (where m is an integer greater than or equal to 2).

With the imaging device according to the present invention as described above, it is preferable for the third frame rate to be 1/m of the second frame rate (where m is an integer greater than or equal to 2).

With the imaging device according to the present invention as described above, it is preferable for the first frame rate to be the least common multiple of the second frame rate and the third frame rate.

With the imaging device according to the present invention as described above, it is preferable for the first frame rate to be p times 120 Hz (where p is an integer greater than or equal to 1), for the second frame rate to be 1/q of 120 Hz (where q is an integer greater than or equal to 2), and for the third frame rate to be 1/r of 120 Hz (where r is an integer greater than or equal to 2).

With the imaging device according to the present invention as described above, it is preferable for the second frame rate to be 30 Hz, and the third frame rate to be 24 Hz.

With the imaging device according to the present invention as described above, it is preferable for the first frame rate to be p times 120 Hz (where p is an integer greater than or equal to 1); for the second frame rate to be either 24 Hz, 48 Hz, or 72 Hz, all of which are integral submultiples of the first frame rate; and for the third frame rate to be 30 Hz.

The present invention proposes an imaging device which includes: a photographic section which photoelectrically converts an image of a subject, and which outputs a picture image signal which consists of fields at a first field rate; a first frame rate conversion section which converts the picture image signal at the first field rate which is outputted by the photographic section into a picture image signal at a second frame rate whose number expressed in Hz is smaller than that of the first field rate; and a second frame rate conversion section which converts the picture image signal at the first field rate into a picture image signal at a third frame rate whose number expressed in Hz is smaller than that of the first field rate, and which is different from that of the second frame rate.

With the imaging device according to the present invention as described above, it is preferable for the second frame rate whose number expressed in Hz to be 1/m of that of the first field rate (where m is an integer greater than or equal to 2).

With the imaging device according to the present invention as described above, it is preferable for the third frame rate whose number expressed in Hz to be 1/m of that of the second frame rate (where m is an integer greater than or equal to 2).

With the imaging device according to the present invention as described above, it is preferable for the first field rate whose number expressed in Hz is the least common multiple of that of the second frame rate and that of the third frame rate.

With the imaging device according to the present invention as described above, it is preferable for the first field rate to be p times 120 Hz (where p is an integer greater than or equal to 1), for the second frame rate to be 1/q of 120 Hz (where q is an integer greater than or equal to 2), and for the third frame rate to be 1/r of 120 Hz (where r is an integer greater than or equal to 2).

With the imaging device according to the present invention as described above, it is preferable for the second frame rate to be 30 Hz, and the third frame rate to be 24 Hz.

With the imaging device according to the present invention as described above, it is preferable for the first field rate to be p times 120 Hz (where p is an integer greater than or equal to 1); for the second frame rate to be either 24 Hz, 48 Hz, or 72 Hz, all of which are integral submultiples of the first field rate, and for the third frame rate to be 30 Hz.

DETAILED DESCRIPTION OF THE INVENTION

Figure 1:
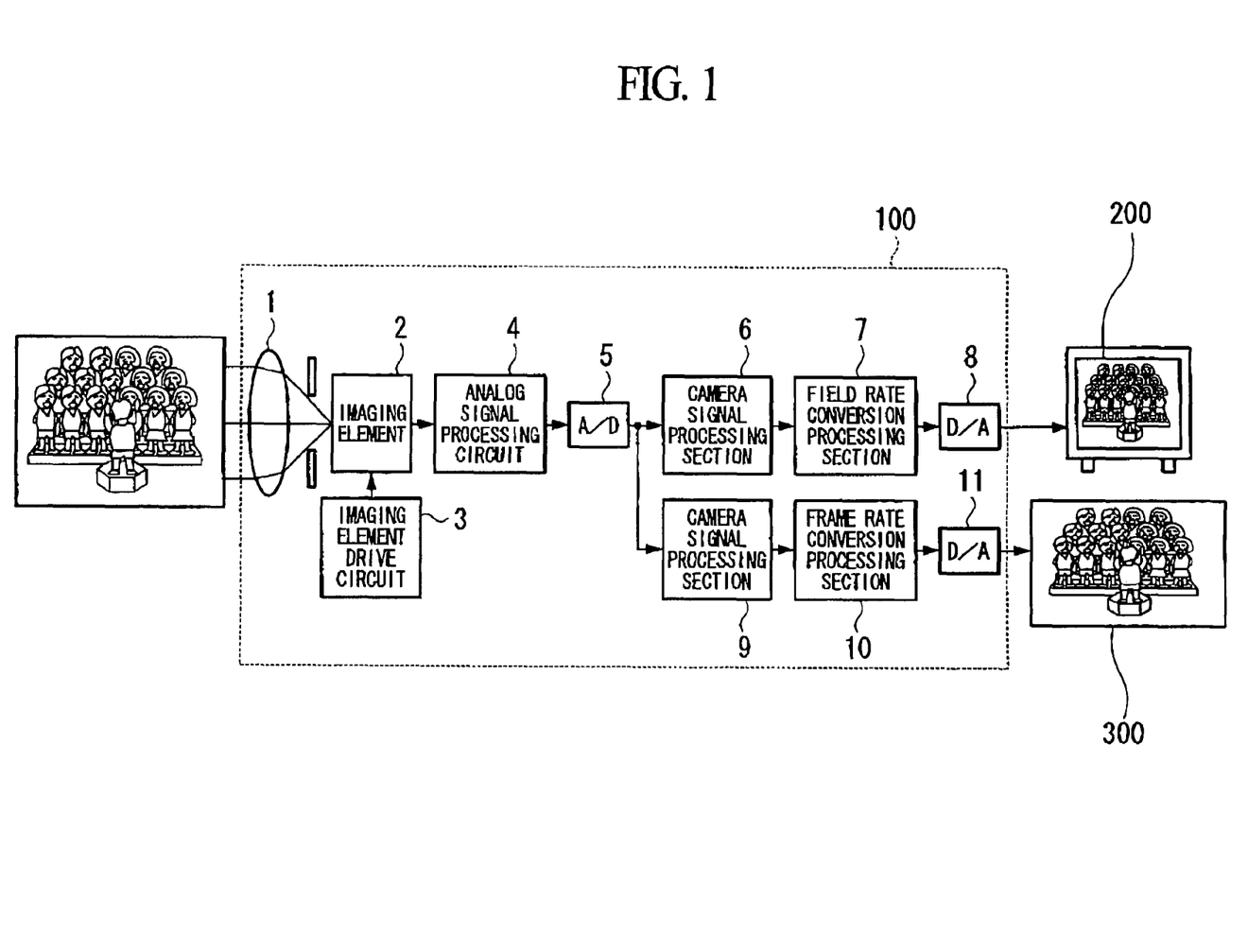
FIG. 1 is a block diagram showing the structure of an imaging device according to a preferred embodiment of the present invention.

In the following, preferred embodiments of the present invention will be described with reference to the drawings. FIG. 1 is a block diagram showing the structure of an imaging device 100 according to a preferred embodiment of the present invention. In the following, the various structures shown in this figure will be explained. An optical lens 1 for a camera focuses the light rays from a subject upon the image plane of an imaging element 2. This imaging element 2 includes a CCD (Charge Coupled Device) or the like, and generates a picture image signal by photoelectric conversion of the image of the subject. In this preferred embodiment of the present invention, the imaging element 2 outputs the picture image signals which it makes for each frame at a frame rate (a first frame rate) of 120 frames/second. An imaging element drive circuit 3 performs drive control of the CCD and the like.

An analog signal processing circuit 4 includes an amplifier which processes the analog image signal, a S/H (sample hold) circuit, an AGC circuit which adjusts the signal level, and the like. An A/D conversion section 5 converts the picture image signal into a digital signal, and along with outputting this signal to a camera signal processing section 6 as a picture image signal for television, also outputs it to a camera signal processing section 9 as a picture image signal for cinema film.

The camera signal processing section 6 performs color adjustment and other processing so that the gamma curve or the like becomes appropriate for a television signal. A field rate conversion processing section (first frame rate conversion section) 7 converts the frame rate of the 120 Hz (120 frames/second) television signal into a frame rate (a second frame rate) of 60 fields/second (=30 frames/second). A D/A conversion section 8 converts this signal into an analog signal, and outputs it to a monitor 200 for external display. This monitor 200 displays a picture image based upon the television signal.

The camera signal processing section 9 performs color adjustment and other processing, so that the gamma curve or the like becomes appropriate for a cinema film. A frame rate conversion processing section (second frame rate conversion section) 10 converts the frame rate of the 120 Hz (120 frames/second) cinema film signal into a frame rate (a third frame rate) of 24 frames/second. A D/A conversion section 11 converts this signal into an analog signal, and outputs it to a external cinema display device 300. This cinema display device 300 displays a picture image based upon the cinema film signal.

Next, the method of converting the frame rate of a picture image signal which is read out from the imaging element 2 into the frame rate of a picture image signal at 60 fields/second will be explained with reference to FIG. 2.

By additively averaging two frames worth of the picture images of the picture image signal at 120 frames/second which is outputted from the imaging element 2, the field rate conversion processing section 7 creates a single picture image, and outputs the even numbered field or the odd numbered field of this picture image at 60 fields/second.

Figure 2:
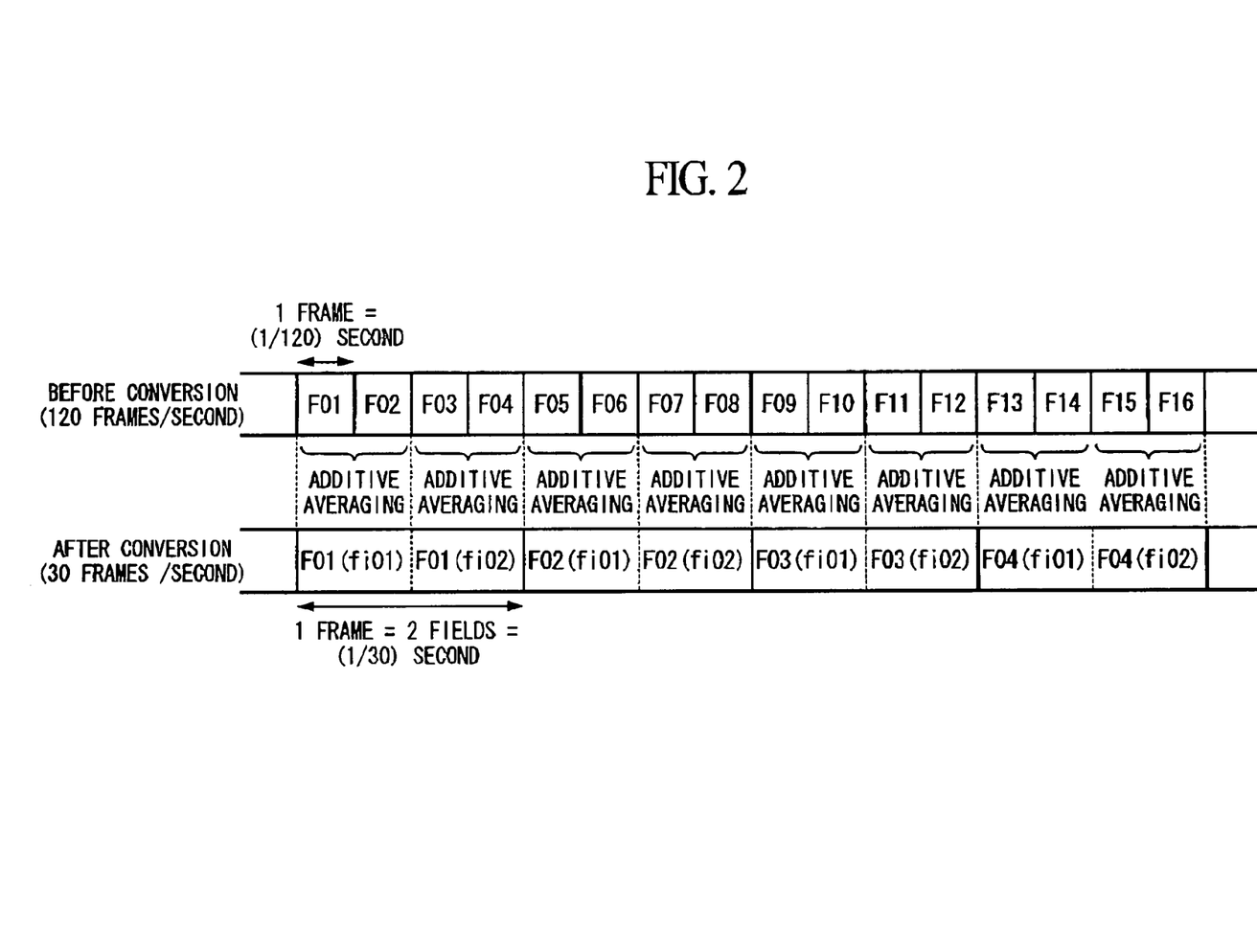
FIG. 2 is a reference figure for explanation of a method of converting a picture image signal at the frame rate of 120 frames/second to a picture image signal for television at 60 fields/second.

As shown in FIG. 2, the picture images of the two frames F01 and F02 are additively averaged, and the even numbered field or the odd numbered field of this picture image after additive averaging is taken as the field fi01 of the frame F01. In the same manner, the picture images of the next two frames F03 and F04 are additively averaged, and the even numbered field or the odd numbered field of this picture image after additive averaging is taken as the field fi02 of the frame F01. Subsequently, two frames worth of picture images are converted into the one field worth of picture image in the same manner. With this method, since none of the photographed picture images are skipped over during readout, accordingly no temporal omissions occur in the picture image.

Next, the method of converting the frame rate of a picture image signal which is read out from the imaging element 2 at 120 frames/second into the frame rate of a picture image signal at 24 fields/second will be explained with reference to FIG. 3. By additively averaging five frames worth of the picture images of the picture image signal at 120 frames/second which is outputted from the imaging element 2, the frame rate conversion processing section 10 creates a single picture image, and outputs this picture image at 24 frames/second.

Figure 3:
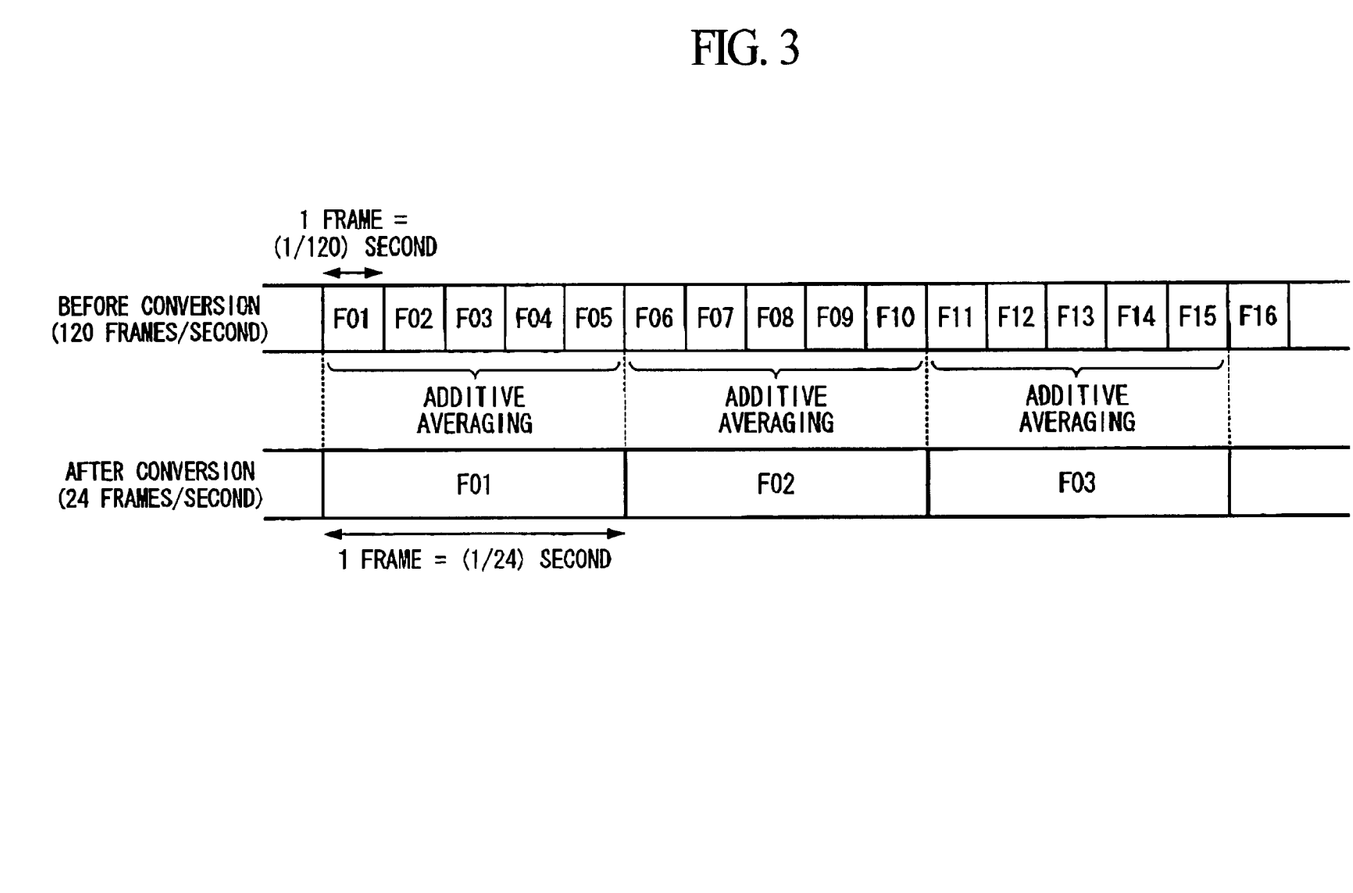
FIG. 3 is a reference figure for explanation of a method of converting a picture image signal at the frame rate of 120 frames/second to a picture image signal for a cinema film at 24 frames/second.

As shown in FIG. 3, the picture images of five frames F01~F05 are additively averaged together, to create the frame F01. Subsequently, five frames worth of picture images are converted into one frames worth of picture image in the same manner. With this method, since none of the photographed picture images are skipped over during readout, accordingly no temporal omissions occur in the picture image.

Figure 4:
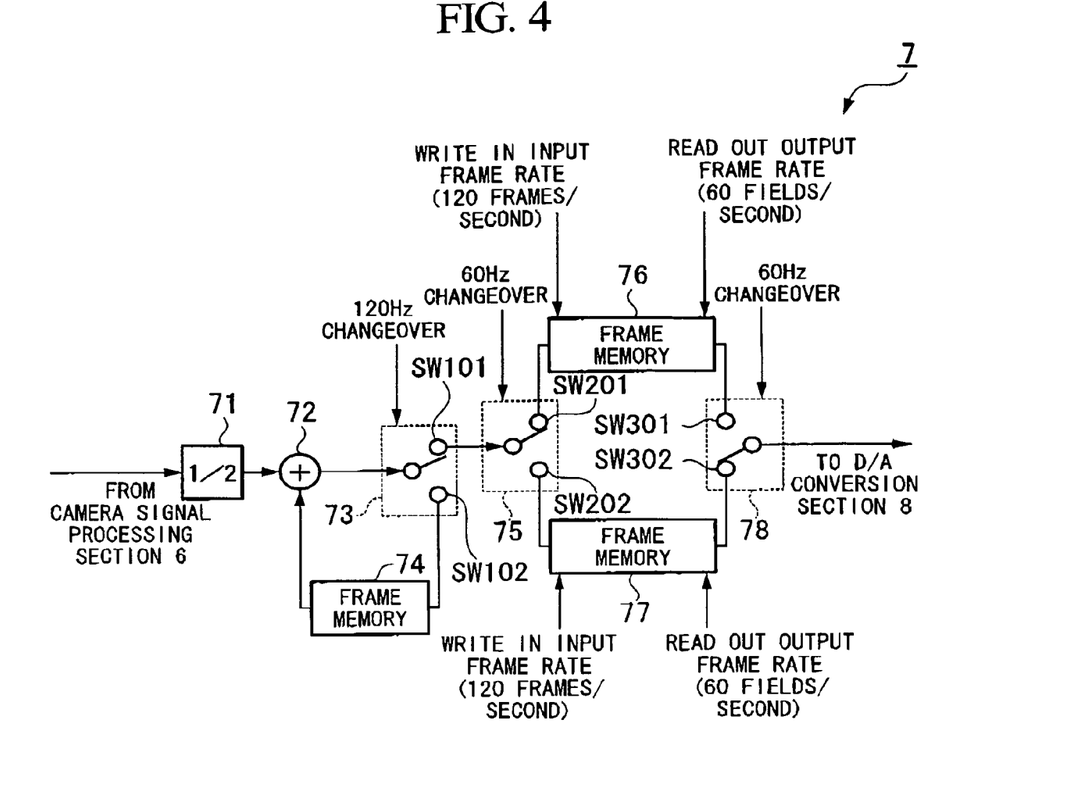
FIG. 4 is a block diagram showing the structure of a field rate conversion processing section 7.

Next, the structure of the field rate conversion processing section 7 in this preferred embodiment will be explained using FIG. 4. A multiplier 71 halves the level of the signal which is inputted to it. An adder 72 adds the output of the multiplier 71 and the output of a frame memory 74 and outputs the result. A switch 73 changes over the output of the signal between a terminal SW101 and a terminal SW102. This switch 73 performs its changing over operation synchronously with the frame rate (120 Hz) of the picture image signal which is inputted to the field rate conversion processing section 7. The frame memory 74 imposes a delay upon one frame of the picture image signal.

A switch 75 changes over the output of the signal between a terminal SW201 and a terminal SW202. This switch 75 performs its changing over operation synchronously with the field rate (60 Hz) of the television signal. The signal which is outputted from the switch 75 is written into frame memories 76 and 77. A switch 78 changes over the output of the signal between a terminal SW301 and a terminal SW302.

The operation of this field conversion processing section 7 will now be described. The picture image signal of the frame F01 which is outputted from the camera signal processing section 6 is reduced to half its original level by the multiplier 71, and is inputted to the switch 73 via the adder 72. The output terminal of the switch 73 is changed over to the terminal SW102 at this time point, and this picture image signal is written into the frame memory 74.

Next, the picture image signal of the frame F02 is inputted, is reduced to half its original level by the multiplier 71, and is inputted to the adder 72. The adder 72 adds together this picture image signal and the picture image signal which is outputted from the frame memory 74, and outputs the result to the switch 73. The output terminal of the switch 73 is changed over to the terminal SW101 at this time point, so that the picture image signals added together, are inputted to the switch 75.

The output terminal of the switch 75 is changed over to the terminal SW201 at this time point, so that the picture image signal, which is set to the additive value of the picture image of the frame F01 and the picture image of the frame F02, is written in to the frame memory 76. The output terminal of the switch 78 is changed over to the terminal SW302 at this time point, so that the picture image signal which is written into the frame memory 77 is outputted. However, the output of the picture image signal from the frame memories 76 and 77 is not performed for each of the frame picture elements; a signal related to the even numbered or the odd numbered field picture elements is outputted.

Figure 5:
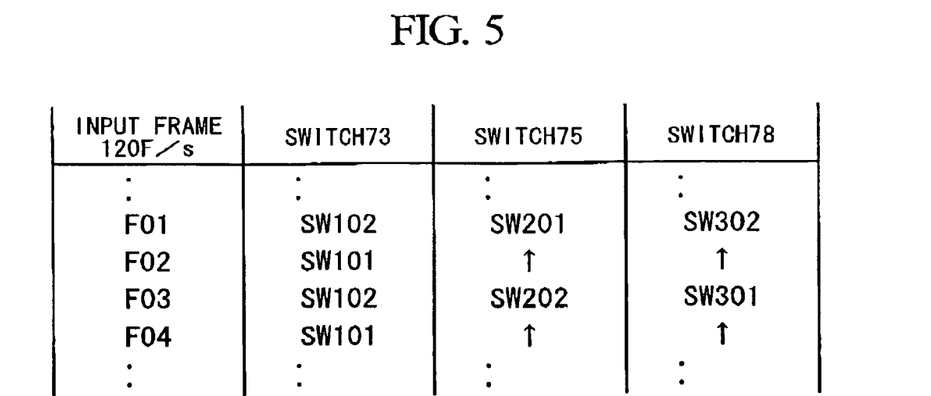
FIG. 5 is a reference figure showing the changeover state of switches 73, 75, and 78.

The subsequent operation proceeds in the same manner. FIG. 5 shows the frame numbers and the corresponding output terminals which are changed over to by the various switches 73, 75, and 78. An arrow sign in that figure means that the same connection state as before is continued. According to this operation, the picture image after additive averaging of the picture image of the frame F01 and the picture image of the frame F02 is written into the frame memory 76, and one fields worth of picture image is outputted when the output terminal of the switch 78 is changed over to the terminal SW301. Furthermore, the picture image after additive averaging of the picture image of the frame F03 and the picture image of the frame F04 is written into the frame memory 77, and one fields worth of picture image is outputted when the output terminal of the switch 78 is changed over to the terminal SW302. By changing over the output terminals of the switch 78 at 60 Hz, picture images of the even numbered or the odd numbered fields are outputted from the field rate conversion processing section 7 at 60 fields/second.

It should be understood that the frame memory 74 is reset every time a picture image signal is outputted. As in the above, by changing the switch 73 over at a rate which is equal to the input frame rate, two frames of the screen input signal which is inputted are combined together. By changing over the switches 75 and 78 at a rate which is equal to the desired output frame rate, the frame rate of the picture image signal is converted, and the picture image signal is outputted Moreover, it should be understood that the switches 73, 75, and 78 will not be required, if the writing in and reading out of the frame memories 74, 76, and 77 is suitably controlled.

Although, in this preferred embodiment, the explanation is made in terms of the first frame rate, at which the picture image signal is read out from the imaging element 2, being 120 Hz (120 frames/second), if the first frame rate is 240 Hz, 360 Hz, . . . , then, respectively, 4, 6, . . . frames worth of picture image are additively averaged together to create a single picture image, and the even numbered fields or odd numbered fields of this picture image are outputted at 60 fields/second. They may be outputted at, not 60 fields/second, but at 120 or 180 fields/second, or the like. By taking the second frame rate of the television signal as being an integral submultiple of the first frame rate, it is possible to make the number of frames of the picture image signal at the first rate which are required for the generation of one field of the picture image signal at the second frame rate to be an integer, so that it is possible to build the field rate conversion processing section 7 comparatively simply.

Figure 6:
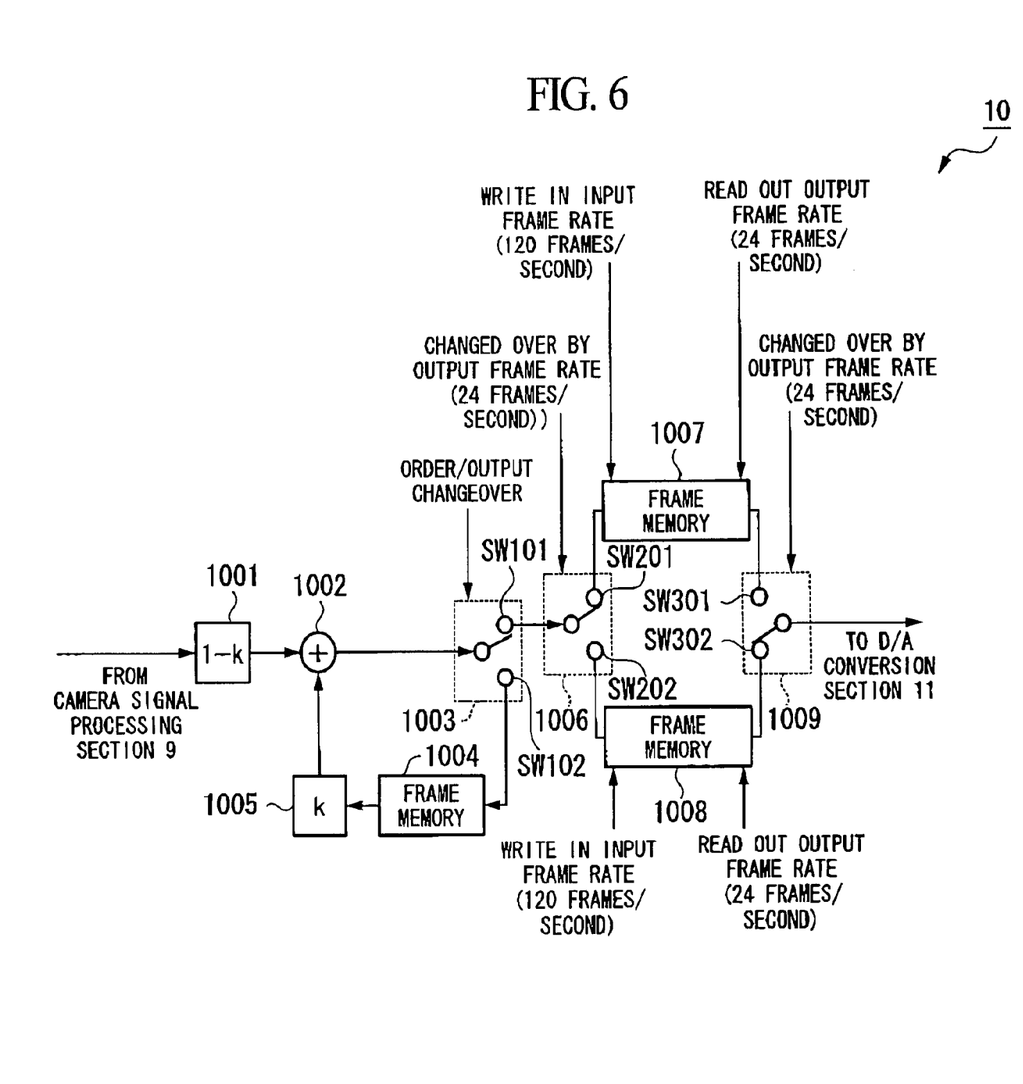
FIG. 6 is a block diagram showing the structure of a frame rate conversion processing section 10.

Next, the structure of the frame rate conversion processing section 10 in this preferred embodiment will be explained with reference to FIG. 6. A multiplier 1001 outputs (1−k) times the level of the signal which is inputted to it. k is an additive coefficient, and it is changed for each input frame as will be explained below. An adder 1002 adds together the output of the multiplier 1001 and the output of a multiplier 1005, and outputs the result. A switch 1003 changes over the output of the signal between a terminal SW101 and a terminal SW102. This switch 1003 performs its changeover operation for each five frames of the picture image signal which is inputted to the field rate conversion processing section 7. A frame memory 1004 imposes a delay upon one frames worth of the picture image signal. A multiplier 1005 multiplies the level of the picture image signal which is outputted from the frame memory 1004 by k times, and outputs the result to the adder 1002. k is the previously mentioned variable additive coefficient.

A switch 1006 changes over the signal output between a terminal SW201 and a terminal SW202.

This switch 1006 performs its changeover operation in synchronism with the frame rate of the cinema film signal (24 Hz). The signal which is outputted from the switch 1006 is written into frame memories 1007 and 1008. A switch 1009 changes over the signal output between a terminal SW301 and a terminal SW302.

This switch 1006 performs its changeover operation in synchrony with the frame rate of the cinema film signal (24 Hz). The signal which is outputted from the switch 1006 is written into frame memories 1007 and 1008. A switch 1009 changes over the signal output between a terminal SW301 and a terminal SW302.

This frame rate conversion processing section 10 operates as follows. That is, Its operation to perform additive averaging the picture image signal while circulating thereof and to read out the signal at the output frame rate is the same as the operation of the field rate conversion processing section 7. However, since the number of additions changes, the additive constant k which determines the ratio of the level of the signal which is delayed to the level of the signal which is inputted is changed.

Figure 7:
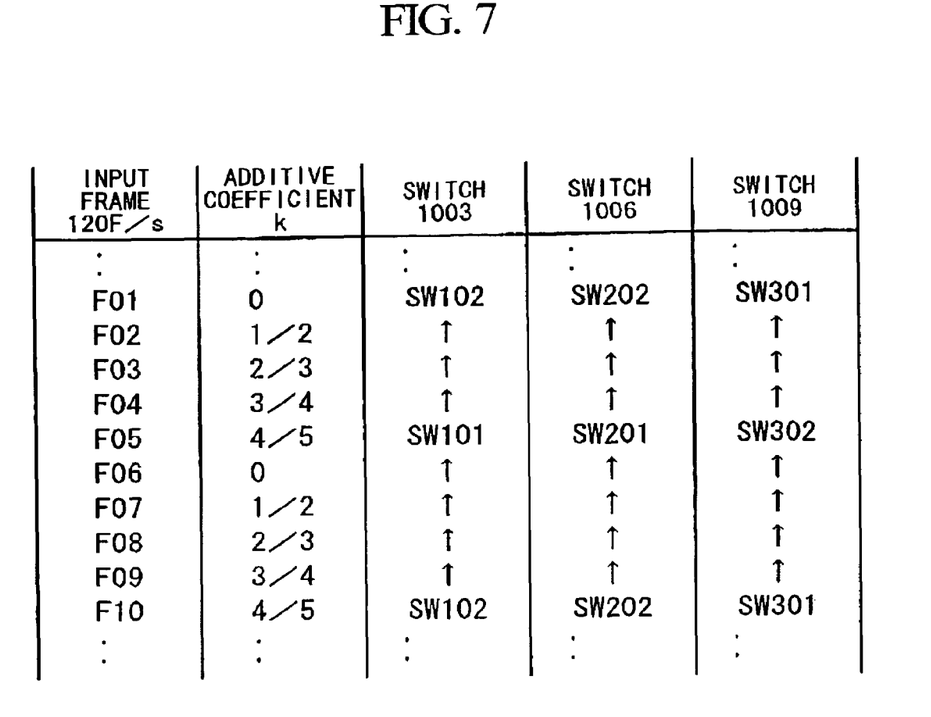
FIG. 7 is a reference figure showing the output terminals which are selected by switches 1003, 1006, and 1009, according to the values of the input frame and of an additive coefficient k.

FIG. 7 shows the output terminals which are selected by the various switches 1003, 1006, and 1009 according to the input frames and the values of the additive coefficient k. An arrow sign in that figure means that the same connection state as before is continued. The picture image signal of the frame F01 which is outputted from the camera signal processing section 9 is inputted to the multiplier 1001. At this time point k=0, and the level of the picture image signal of the frame F01 is maintained just as it is, and this signal is inputted via the adder 1002 to the switch 1003.

The output terminal of the switch 1003 is changed over to the terminal SW102 at this time point, and this picture image signal is written into the frame memory 1004.

Next, the picture image signal of the frame F02 is inputted to the multiplier 1001. At this time point k=½, and the picture image signal of the frame F02 is reduced to half its original level by the multiplier 1001, and is then inputted to the adder 1002. At the same time, the picture image signal of the frame F01 which is outputted from the frame memory 1004 is reduced to half its original level by the multiplier 1005, and is inputted to the adder 1002. The adder 1002 adds together the picture image signals of the frames F01 and F02, the levels of both of which have been halved, and outputs the result to the switch 1003. Since the output terminal of the switch 1003 is connected to the terminal SW102, this picture image signal (the additive average of the picture image signals of the frames F01 and F02) is written into the frame memory 1004.

Next, the picture image signal of the frame F03 is inputted to the multiplier 1001. At this time point k=⅔, and the picture image signal of the frame F03 is reduced to ⅓ of its original level by the multiplier 1001, and is then inputted to the adder 1002. At the same time, the combined picture image signal of the frames F01 and F02 which is outputted from the frame memory 1004 ((F01+F02)×(½)) is reduced to ⅔ of its original level by the multiplier 1005, and is inputted to the adder 1002.

The adder 1002 adds together the combined picture image signal of the frames F01 and F02 and the picture image signal of the frame F03, and outputs the result to the switch 1003. Since the output terminal of the switch 1003 is connected to the terminal SW102, this picture image signal (the additive average of the picture image signals of the frames F01, F02, and F03, i.e. (F01+F02+F03)×(⅓)) is written into the frame memory 1004.

The subsequent operation proceeds in the same manner. When the picture image signal of the frame F05 is inputted into the frame rate conversion processing section 10, a picture image signal which is built up by additively averaging the picture image signals of the frames F01 through F05 is outputted to the switch 1003. At this time point, the output terminal of the switch 1003 is changed over to the terminal SW101, and thus this picture image signal is written into the frame memory 1007. When the output terminal of the switch 1009 is changed over to the terminal SW301, this picture image signal is outputted.

In the same manner, a picture image signal which is built up by additively averaging the picture image signals of the frames F06 through F10 is written into the frame memory 1008, when the output terminal of the switch 1009 is changed over to the terminal SW302, this picture image signal is outputted. By switching over the output terminals of the switch 1009 in synchronism with the frame rate of cinema film (24 frames/second), these picture images after additive averaging are outputted from the frame rate conversion processing section 10 at 24 frames/second.

It should be understood that the frame memory 1004 is reset every time a picture image signal is outputted. Furthermore, it should be understood that the switches 1003, 1006, and 1009 will not be required, if control of the writing in and reading out of the frame memories 1004, 1007, and 1008 is suitably performed.

In this preferred embodiment of the present invention, it is assumed that the first frame rate of the picture image signal which is read out from the imaging element 2 is 120 Hz (120 frames/second). Incidentally if the first frame rate is 240 Hz, 360 Hz, . . . , the frame rate of the picture image which is outputted is 48 frames/second, 72 frames/second, . . . , then, if the number of frame picture images which are additively averaged is 10, 15, . . . , it is possible to read out at 24 frames/second. By making the third frame rate of the cinema signal to be an integral submultiple of the first frame rate, it is possible to make the number of frames of the picture image signal at the first frame rate which are necessary for building up a single frame of the picture image signal at the third frame rate to be an integer, so that it is possible to make the frame rate conversion processing section 10 with a comparatively simple structure.

Although this concept is not shown in the drawings, it should be understood that, even without building the above described field conversion processing section 7 and frame conversion processing section 10 as cyclic type additive circuits, a structure would also be acceptable in which all the frames to be added together are all added together at the appropriate time point, by using at least as many frame memories as the number of frames which are required to be added together.

Figure 8:
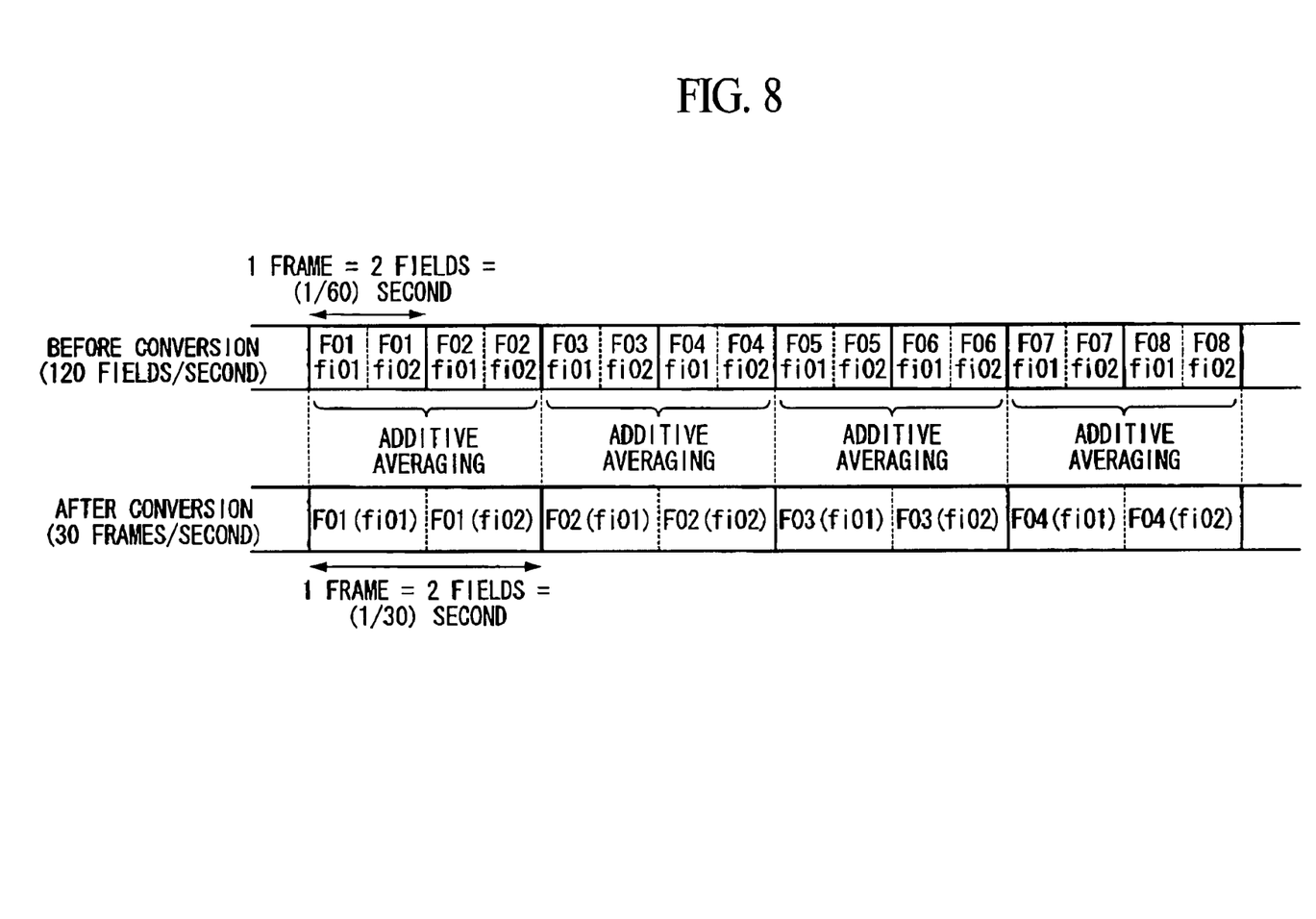
FIG. 8 is a reference figure for explanation of a method of converting a picture image signal at the frame rate of 120 fields/second to a picture image signal for television at 60 fields/second.
Figure 9:
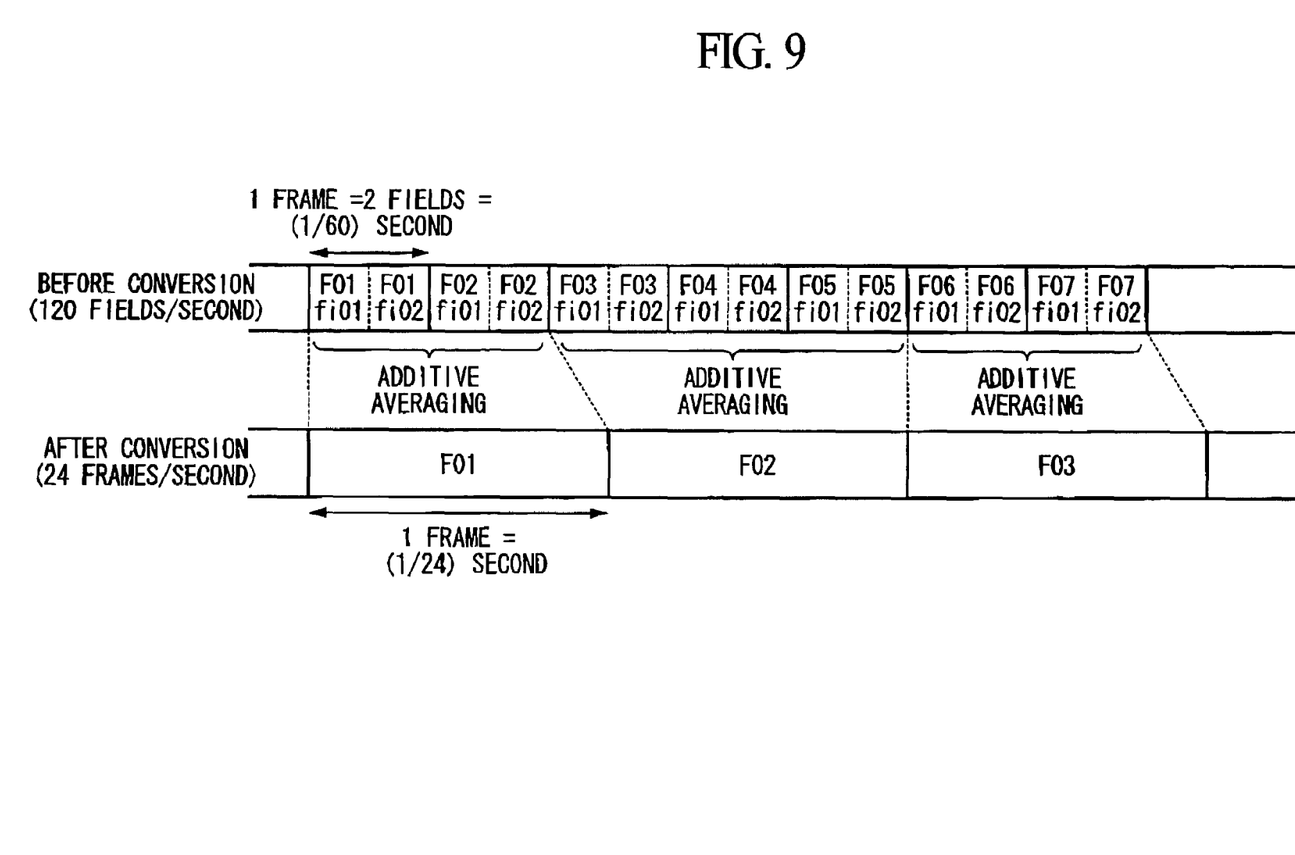
FIG. 9 is a reference figure for explanation of a method of converting a picture image signal at the frame rate of 120 frames/second to a picture image signal for a cinema film at 24 frames/second.

In the above description of this preferred embodiment of the present invention, the example is used of a method in which the picture images were read out from the imaging element 2 one frame at a time, the situation would also be the same with a method in which the picture images are read out from the imaging element 2 one field at a time. FIGS. 8 and 9 show the field rate conversion method in this case. In the following, there will be explained a method of converting the field rate, in which the reading out of the picture images from the imaging element 2 is performed at 120 fields/second (=60 frames/second) (the first field rate), and along with converting this picture image signal into a television signal at 60 fields/second (=30 frames/second) (the second frame rate), it is also converted into a cinema film signal at 24 frames/second (the third frame rate), FIG. 8 shows the method of converting the picture image signal at 120 fields/second into a television signal at 60 fields/second (=30 frames/second). A single frames worth of picture image is constructed by additively averaging four fields worth of picture images which are inputted at 120 Hz, and the even numbered fields and the odd numbered fields are read out from this picture image twice, thus at 60 fields/second. In the following, in the same manner, a single frames worth of television signal picture image is constructed by additively averaging four fields worth of picture images.

The structure of the field rate conversion processing section 7 in this case is the same as the structure previously described.

If the first field rate is 240 Hz, 360 Hz, ..., then the frame rate of the picture images which are outputted becomes 120 fields/second, 180 fields/second, ..., if the number of fields of the picture image which are additively averaged are made to be 8, 12, ..., then it is still possible to read out at 60 fields/second. By making the second frame rate of the television signal to be an integral submultiple of the first field rate, it is possible to make the number of frames of the picture image signal at the first field rate which are required for constructing a single frame of the picture image signal at the second frame rate to be an integer, and thus it is possible to construct a field rate conversion processing section 7 of a comparatively simple structure.

FIG. 9 shows the method for converting the picture image signal at 120 fields/second to a cinema film signal at 24 frames/second. A first single frames (F01) worth of picture image is constructed by additively averaging four fields worth of picture images which are inputted at 120 Hz, and the next single frames (F02) worth of picture image is constructed by additively averaging the next six fields worth of picture images. Subsequently, the picture image signal at 24 frames/second is constructed by additively averaging four fields worth of picture images alternatingly, and six fields worth of picture images in the same manner. The structure of the frame rate conversion processing section 10 in this case is the same as that described previously. It is a matter of design whether the additive averaging of the four fields worth of picture images is performed first, or whether the additive averaging of the six fields worth of picture images is performed first; and the present invention is not to be considered as being limited to either one of these alternatives.

If the first field rate is 240 Hz, 360 Hz, ..., then the frame rate of the picture image which is outputted becomes 48 frames/second, 72 frames/second, ..., if the number of fields of the picture image which are additively averaged is (10, 10), (14, 16), then it is still possible to read out at 24 frames/second. (10, 10) means that a first single frames worth of picture image is constructed by additively averaging 10 fields worth of picture images, and the next single frames worth of picture image is constructed by additively averaging the next 10 fields worth of picture images. By making the third film rate of the cinema film signal be an integral submultiple of the first field rate, it is possible to make the number of frames of the picture image signal at the first field rate which is required for constructing a single frame of the picture image signal at the third frame rate to be an integer, and it is accordingly possible to construct a frame rate conversion processing section 10 which is of a comparatively simple structure.

In the above description of this preferred embodiment of the present invention, two streams of output is provided. Incidentally, the present invention is not to be considered as being limited to that case; it would also be possible to output picture image signals at three or more different frame rates. Furthermore, it would also be acceptable to provide a frame rate (field rate) conversion circuit which is compatible with a plurality of frame rates, and to operate by changing over the frame rate (field rate) of this conversion circuit, so that a picture image signal at the desired frame rate from among these is obtained.

In the above description of this preferred embodiment of the present invention, a television signal and a cinema film signal are constructed from the picture image signal which is generated by the imaging element 2, it would also be acceptable to construct a plurality of cinema film signals at different frame rates from the picture image signal which is generated by the imaging element 2. Although, in the case of cinema signals, the photography is normally performed at 24 frames/second, it would also be possible to perform photography at 12 frames/second or at 48 frames/second, i.e. in so called slow motion or high speed motion.

For example, in some cases, in order to show a fighting scene in a more exciting manner, the photography is performed at 12 frames/second, and these picture images are played back at 24 frames/second. Furthermore, in order to emphasize the profound feeling of a ship, the photography is performed at 48 frames/second, and these picture images are played back at 24 frames/second. Therefore, by converting the first frame rate into several frame rates, with only a single episode of photography, it is possible to replay the picture image while selecting the most suitable frame rate for artistic direction when replaying the picture image.

According to this preferred embodiment of the present invention, the picture image signal which is photographed at the first frame rate (or at the first field rate) is divided up into a picture image signal at a frame rate which is smaller that that first frame rate (or first field rate), accordingly it is possible to construct both a television signal and a cinema film signal from the picture image which is photographed at that first frame rate (or first field rate). It is possible to perform frame rate conversion of the picture image signal without the requirement for time axis conversion such as 2-3 pulldown or kinescope operation or the like. Furthermore, each of the television signal and the cinema film signal which are obtained in this manner is a most appropriate picture image for its own particular purpose.

Furthermore, it is preferable for the ratio between the first frame rate (or the first field rate) and the second and third frame rate into which it is converted, to be an integer. Moreover, it is preferable for the first frame rate (or the first field rate) to be the least common multiple of the second and third frame rate. Therefore, it is possible to make the structure of the various types of circuit which are required for this frame rate conversion to be comparatively simple.

By converting the first frame rate (or the first field rate) into several different frame rates, since the picture image signals at these several different frame rates are generated with only a single episode of photography, accordingly it is possible to replay the picture image while selecting the most suitable frame rate for artistic direction when replaying the picture image.

It is preferable for the first frame rate (or the first field rate) during photography to be 120 Hz, or to be an integer multiple of 120 Hz (such as 240 Hz, 360 Hz, ...). Therefore, it is possible to create picture image signals at a plurality of frame rates which include the 24 frames/second for cinema film and the 30 frames/second (=60 fields/second) for television.

Furthermore, if the first frame rate (or the first field rate) during photography is 120 Hz, or is an integer multiple of 120 Hz (such as 240 Hz, 360 Hz, ...), by making the second frame rate be 30 Hz, and the third frame rate be 24 Hz, it is possible to create a television signal and a cinema film signal at the same time. Accordingly, it is possible to perform frame rate conversion of the picture image signals without requirement for time axis conversion such as 2-3 pulldown or kinescope operation. Thus, each of the television signal and the cinema film signal which are obtained in this manner is a most appropriate picture image for its own particular purpose.

Moreover, when photographing a high speed subject such as one with which after-images would be present if it is photographed at a frame rate of 24 frames/second as during cinema photography, by making the first frame rate (or the first field rate) during photography to be 120 Hz, or an integer multiple of 120 Hz (such as 240 Hz, 360 Hz, . . .), by making the second frame rate be an integral submultiple (any of 24 Hz, 48 Hz, or 72 Hz) of the first frame rate (or the first field rate), and by making the third frame rate be an integral submultiple (30 Hz) of the first frame rate (or the first field rate), it is possible to photograph a picture image for cinema film at a frame rate which is a multiple of 24.

In this case, if the first frame rate (or the first field rate) is 120 Hz, the second frame rate is 24 Hz. If the first frame rate (or the first field rate) is 240 Hz, the second frame rate is 24 Hz or 48 Hz; and, if the first frame rate (or the first field rate) is 360 Hz, the second frame rate is 24 Hz, 48 Hz, or 72 Hz.

Furthermore since, when the rate of reading out from the imaging element is changed from 120 frames/second to 120 fields/second, the number of clock pulses which are required to read out a single picture element (a single frame) is reduced to half, accordingly it is possible to reduce the amount of heat which is generated, and the power consumption. Moreover, since the exposure time for each picture element becomes twice as long, the signal level is enhanced, and it is possible to improve the signal to noise ratio.

Since, according to the present invention, a picture image signal which is photographed at a first frame rate (or at a first field rate) is subdivided into a picture image signal at a rate which is smaller than the first frame rate (or the first field rate), accordingly it is possible to generate both a television signal and also a cinema film signal from the picture image which is photographed at the first frame rate (or the first field rate). Therefore, it is possible to perform frame rate conversion between the picture image signals without the time axis conversion such as 2-3 pulldown or kinescope operation.

While preferred embodiments of the invention are described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An imaging device which outputs a picture image signal at a first frame rate and another picture image signal at a second frame rate which is different from the first frame rate, comprising:
a photographic section which photoelectrically converts an image of a subject, and which outputs the picture image signal which consists of frames at the first frame rate;
a first frame rate conversion section which converts the picture image signal at the first frame rate which is outputted by the photographic section into the picture image signal at the second frame rate which is smaller than the first frame rate; and
a second frame rate conversion section which converts the picture image signal at the first frame rate into a picture image signal at a third frame rate which is smaller than the first frame rate, and which is different from the second frame rate, wherein
the first frame rate is the least common multiple of the second frame rate and the third frame rate.

2. An imaging device according to claim 1, wherein the first frame rate is p times 120 Hz (where p is an integer greater than or equal to 1), the second frame rate is 1/q of 120 Hz (where q is an integer greater than or equal to 2), and the third frame rate is 1/r of 120 Hz (where r is an integer greater than or equal to 2).

3. An imaging device according to claim 2, wherein the second frame rate is 30 Hz, and the third frame rate is 24 Hz.

4. An imaging device according to claim 2, wherein:
the first frame rate is p times 120 Hz (where p is an integer greater than or equal to 1);
the second frame rate is one of 24 Hz, 48 Hz, or 72 Hz, all of which are integral submultiples of the first frame rate; and
the third frame rate is 30 Hz.

5. The imaging device according to claim 1, wherein
at least one of the first frame rate conversion section and the second frame rate conversion section forms single picture image by additively averaging a plurality of frames of picture images.

6. An imaging device which outputs a picture image signal at a field frame rate and another picture image signal at a second field rate which is different from the first field rate, comprising:
a photographic section which photoelectrically converts an image of a subject, and which outputs a picture image signal which consists of fields at a first field rate;
a first frame rate conversion section which converts the picture image signal at the first field rate which is outputted by the photographic section into a picture image signal at a second frame rate which is smaller than that of the first field rate; and
a second frame rate conversion section which converts the picture image signal at the first field rate into a picture image signal at a third frame rate which is smaller than that of the first field rate, and which is different from that of the second frame rate, wherein
the first field rate is the least common multiple of the second frame rate and the third frame rate.

7. An imaging device according to claim 6, wherein the first field rate is p times 120 Hz (where p is an integer greater than or equal to 1), the second frame rate is 1/q of 120 Hz (where q is an integer greater than or equal to 2), and the third frame rate is 1/r of 120 Hz (where r is an integer greater than or equal to 2).

8. An imaging device according to claim 7, wherein the second frame rate is 30 Hz, and the third frame rate is 24 Hz.

9. An imaging device according to claim 7, wherein:
the first field rate is p times 120 Hz (where p is an integer greater than or equal to 1);
the second frame rate is one of 24 Hz, 48 Hz, or 72 Hz, all of which are integral submultiples of the first field rate; and
the third frame rate is 30 Hz.

10. The imaging device according to claim 6, wherein
at least one of the first field rate conversion section and the second field rate conversion section forms a single picture image by additively averaging a plurality of fields of picture images.

* * * * *